(No Model.)
J. MADISON.
HAY BINDER FOR WAGON RACKS.
No. 299,817. Patented June 3, 1884.
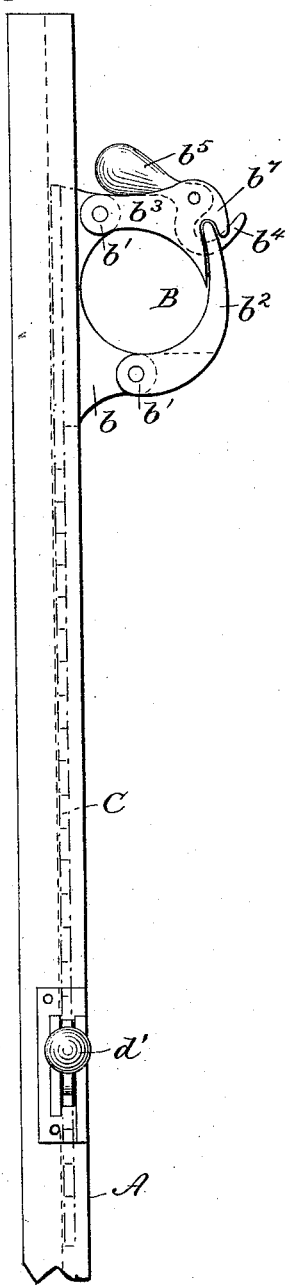
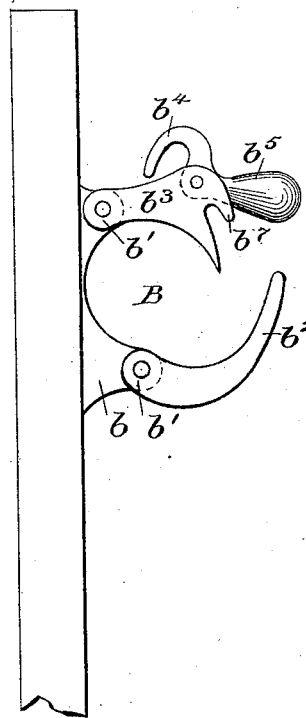
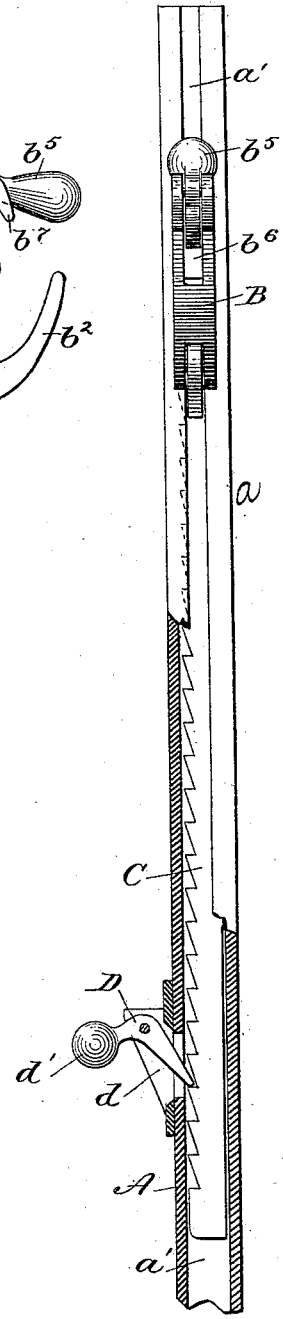
Witnesses:
Frank C. Doty.
A. M. Long.
Inventor:
Joel Madison
By W. N. Severance
Atty.

UNITED STATES PATENT OFFICE.

JOEL MADISON, OF FARMINGTON, MINNESOTA.

HAY-BINDER FOR WAGON-RACKS.

SPECIFICATION forming part of Letters Patent No. 299,817, dated June 3, 1884.

Application filed March 17, 1884. (No model.)

*To all whom it may concern:*

Be it known that I, JOEL MADISON, a citizen of the United States, residing at Farmington, in the county of Dakota and State of Minnesota, have invented certain new and useful Improvements in Wagon or Hay Rack Standards for Securing the Boom or Binding Pole; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to hay or wagon racks; and it consists in a standard attached to the rear of such racks, used for hauling hay, straw, and similar loose and light substances, which standard is provided with a vertically-moving ratcheted or toothed bar, the ratchets or teeth of this bar, when in operation, being engaged by a pawl located on the standard.

It also consists in a novel hinged ring for receiving, retaining, and releasing the boom or binding pole of the load, as will hereinafter more fully appear.

Figure 1 is a side elevation. Fig. 2 is an enlarged view of Fig. 1, showing the hinged ring in opened position. Fig. 3 is a front elevation, part in section, showing the pawl and ratchet of the sliding bar.

The same letters and numerals are used in referring to identical parts of the drawings.

The standard A extends somewhat lower than shown in the drawings, and attaches to the wagon-rack or hay-rack, preferably by the use of two suitable bolts.

The plate $a$, provided with the slot $a'$, is securely bolted onto the standard A. This slot is to admit the free passage of the shank $b$ of the hinged open ring B. The shank $b$ of the ring B is formed upon and a part of the vertically-sliding toothed bar C, and this shank is provided with the lugs or hinge-ears $b'$. Upon the lower one the segmental or cycle-shaped bar $b^2$ is properly hinged, and upon the upper one the locking-section $b^3$ of the hinged ring is located, which consists of the pinioned hook $b^4$, provided with the weighted handle $b^5$. The cycle-shaped bar $b^2$ has an opening, $b^6$, in its outer or free end to receive freely the hook $b^4$, and to provide great strength the segmental bar $b^2$ passes under a projecting lug or lip, $b^7$, of the bar $b^3$.

The pawl D is freely hinged to the flanged plate $d$, and is constructed with the weighted arm $d'$, and all securely attached to the standard A, well down toward its lower end.

Operation: When the operator desires to secure the boom or binding pole firmly upon the load to retain it in position with my device, he closes the hinged ring about the boom and casts the parts together simply by adjusting the two segmental parts and passing the locking-hook through the bar $b^2$. Then, by applying downward pressure to the boom, the hinged ring carries the toothed bar C downward, and all downward motion is secured by the pawl D, as shown in position in the drawings.

Great pressure is required to retain loads of hay and like substances in position, especially for long drives over uneven roads. My invention provides for securely applying any required degree of pressure and readily and easily releasing the same. The weighted handle $b^5$ of the pinioned hook $b^4$ retains it in position while in use, and by swinging the handle outward the boom or binding pole is released.

I am aware that heretofore there have been rings constructed to open for releasing the boom-pole, reference being had to United States Patent No. 182,537.

Having thus fully described my invention, what I claim as new in a boom-pole holder or load-binder, and for which I desire to secure Letters Patent, is—

1. The toothed sliding bar C, provided with the hinged opening ring B, in combination with the standard A, provided with the slotted plate $a$ and the pawl D, constructed and arranged as and for the purposes substantially as set forth.

2. The hinged opening ring B, consisting of the segmental bar $b^2$, provided with the slot $b^6$, in combination with the segmental bar $b^3$ provided with the locking-hook $b^4$, having the weighted handle $b^5$, and the lug or lip $b^7$, constructed and arranged substantially as described, as and for the purposes set forth.

3. The combination of the hinged opening ring B, constructed as described, with the toothed bar C and the standard A, provided with the slotted plate *a* and the pawl D, constructed and arranged as and for the purposes substantially as set forth.

In testimony whereof I affix my signature in presence of two witnesses.

JOEL MADISON.

Witnesses:
ROSWELL JUDSON,
LEVI P. DODGE.